United States Patent
Latypov

[19]

[11] Patent Number: 5,846,134

[45] Date of Patent: Dec. 8, 1998

[54] METHOD AND APPARATUS FOR IMMERSION OF A USER INTO VIRTUAL REALITY

[76] Inventor: Nurakhmed Nurislamovich Latypov, Ulitsa Vasilisy Kozhinoi, d.18/1, kv. 56 Moscow, Russian Federation

[21] Appl. No.: 678,706

[22] Filed: Jul. 11, 1996

[30] Foreign Application Priority Data

Jul. 14, 1995 [RU] Russian Federation ............. 95113085

[51] Int. Cl.⁶ .............................. A63G 31/16; G09B 9/00
[52] U.S. Cl. ................. 463/46; 463/31; 463/36; 472/60; 472/130; 434/55; 434/307 R
[58] Field of Search ..................... 463/1, 30–33, 463/36, 9; 434/29, 55, 307 R, 365; 472/60, 130, 133, 88–94; 395/118, 125, 119, 129, 133, 173; 348/383, 552, 36, 39; 345/4–10

[56] References Cited

U.S. PATENT DOCUMENTS

| | | | |
|---|---|---|---|
| 5,130,794 | 7/1992 | Ritchey | 348/383 |
| 5,388,990 | 2/1995 | Beckman | 434/307 R |
| 5,490,784 | 2/1996 | Carmein | 434/29 |
| 5,495,576 | 2/1996 | Ritchey | 395/125 |
| 5,533,933 | 7/1996 | Garnjost et al. | 472/60 |

*Primary Examiner*—Jessica Harrison
*Assistant Examiner*—Mark A. Sager
*Attorney, Agent, or Firm*—Pennie & Edmonds LLP

[57] ABSTRACT

A method for immersion of a user into virtual reality consisting in that a closed shell limiting a real closed space is formed and the shell is arranged on a support means with the possibility of rotation about its center. A user who has the possibility for free movement along the inner surface of the shell is placed in the shell. Wherein the shell turns in a direction opposite to the direction of movement of the user due to the effect of the moment of force produced when the center of gravity of the user is displaced relative to a vertical passing through the center of the shell. Then a virtual space is formed in which objects appear and move in a predetermined and random manner. This formed virtual space is displayed to the user. Continuous conversion of the virtual space is carried out in accordance with real physical hand, foot and head movements of the user in the real space, taking into account interaction with the objects in virtual space.

24 Claims, 5 Drawing Sheets

METHOD AND APPARATUS FOR IMMERSION OF A USER INTO VIRTUAL REALITY

The present invention relates to computer games, to space, sport, military trainers, and more exactly to a method and apparatus for immersion of a user into virtual reality.

The invention may be used for the entertainment of children and adults. Apparatuses for computer games may be set up in a building, in the yard, in arcades. The apparatus can be widely used to teach and train military personnel, sportsmen, and during the teaching of different specialties to, for example, policemen. The apparatus may be useful for research when a study is being made of the behavior of a human being in a computer virtual space.

Virtual reality, this is a combination of means which make it possible to create an illusion in a user that he is in an artificially created world by replacing the usual perception of surrounding reality by means of sense organs with information generated by a computer. This is achieved by using three-dimensional graphics and special devices providing information, imitating the usual relationship between the user and the surrounding world. At present virtual reality is an independent branch of computer technology.

Virtual reality is what makes it possible to move in a three-dimensional world with six degrees of freedom and view it in real time. This means that the program provides for, and the apparatus identifies six types of movement: forward and backward, up and down, to the left and to the right, pitch, yaw, roll. Virtual reality is an artificial medium which may imitate physical reality or be unusual and fantastic.

Virtual reality provides the user with the rare opportunity of almost really feeling his presence in some other world. In that world they can see each other, talk and interact in a three-dimensional space, distinguishing color and sound. Such a complete inmmersion creates an impressive effect of being present. This is achieved by the equipment used—a headpiece with built-in earphones and a manipulator which is sensitive to spatial movement.

In the simplest variant of a virtual reality system, contact with the virtual world is accomplished through a usual monitor of a personal computer which serves as a window into that world. Additional means such as a data glove, used to manipulate objects in a virtual medium, and a visual interface in the form of a head-mounted display (HMD), make it possible to see all the way around only in the virtual space, the image of which will change when the joystick is manipulated, this intensifying the sensation and making it possible to even deeper immerse into that space.

The means forming virtual reality comprise a high-performance computer, usually including an accelerator of three-dimensional graphics from a simple personal computer to supercomputers and virtual reality software, for example, such as VIRTUS VR, VIRTUS WALKTHROUGH PRO, SUPERSC APE VRT, VRCREATOR et al.

All possible types of monitors, Head-Mounted Displays or Cave Automatic Virtual Environment (CAVE) are means for displaying virtual reality, i.e. means for hearing and seeing.

Traditional and nontraditional I/O devices, special three-dimensional mice, gloves, joysticks and tracking devices are means for interaction with virtual reality. For example, the CyberGlove of the Virtual Technologies firm tracks almost any movement which the hand can make.

Tracking devices make it possible to determine the position of the hands, feet and body of the user and their orientation in the real world and to display them in the virtual world. Tracking systems can be distinguished by the principle of detecting movement—with mercury balancers, radio waves, ultrasonics, lasers, etc.

A simple set of means, which was available 7–8 years ago, is known for forming virtual reality (see, for example, the DOOM game of the ID Software firm, "Entsiklopediya kompjuternykh igr," Sankt Peterburg, 1995, pp. 119–122). This set comprises a stationary computer, a color monitor opening a "window" into the virtual world which seemingly lies on the other side of the screen. A manipulator device of the mouse, joystick or keyboard type provides the possibility of controlling movement, turning, viewing in any horizontal direction of the virtual space.

In this game full immersion into virtual reality does not take place, since the virtual space is seen through a "window," which is limited by the edges of the picture tube screen. Movement is controlled manually by means of a manipulator. The system does not reflect the interactivity of physical movement by the user in the virtual space.

The growing power of computers and the appearance of more highly developed audio-visualization means has resulted in the creation of a stereoscopic monitor or projector type apparatus for displaying virtual reality, which the user can put on his head as a headpiece or glasses and obtain thereby the possibility of seeing a three-dimensional image (see, for example, the journal Mir PK, No. 1, 1995, pp. 164–175).

In this apparatus the virtual world becomes full-size, extends beyond the limits of the screen and surrounds the user. Full freedom of movement in virtual space becomes possible, a view up-and-down at some angle is possible in addition to a horizontal view. Manipulators of the three-dimensional mouse type, "gloves" make interaction with objects possible. They either respond to that with an expectable reaction or are deformed. Such a level of the means makes more complete immersion into virtual space possible, makes is possible to feel oneself inside that virtual space and interact with the objects.

However, control of the objects and their movement is effected by means of manipulators and this does not make it possible to identify movement in the virtual space and in real space.

The latest developments in the field of virtual reality ensure alnost complete immersion of the user into virtual space.

A method of forming virtual space is known, consisting of forming a virtual space in which objects appear and move in a predetermined and random manner, displaying the formed virtual space to the user, effecting continuous conversion of virtual space in accordance with real physical hand, foot and head movements of the user in real space, taking into account interaction with the objects in virtual space.

An apparatus is also known for immersion in virtual reality which comprises means for forming virtual space, in which objects appear and move in a predetermined and random manner, and to which are connected means for display of the virtual space to the user and a unit for conversion of the virtual space in accordance with the real physical hand, foot and head movements of the user in real space, taking into account interaction with the objects in the virtual space (see, for example, the PC Magazine, Russian Edition, No. 6, 1995, pp. 60–79).

In this apparatus for immersion into virtual reality, a state-of-the-art headpiece, making it possible to track the position of the head, is used as the means for displaying the virtual space. This information is sent to a computer—the means for forming the virtual space—which calculates the according image. If the user looks up, he sees a virtual sky, if down—virtual ground, i.e. a view in any direction is possible in the virtual space. The possibility for interaction of the user with virtual objects is enhanced. It is possible to take hold of a three-dimensional object of virtual reality and throw it away or take a three-dimensional object and deform it.

But even in this case with sufficiently highly developed hardware and software, the user is forced to imitate his motion in an "infinite virtual space" by means of manipulators. Complete immersion of the user into virtual reality does not take place, since it is not possible for the user to freely move in real space with a headpiece on his head while interacting with the aforesaid apparatus. Real space surrounding the user while he is playing a game or is training is usually limited by a small area where the user cannot freely move in any direction to any substantial distance.

The object at the base of the present invention is to create a method of immersing a user in virtual reality in which the formation of a real closed space and the conversion of virtual space in accordance with real physical movements of the user make it possible for the user to move in a limited real space by steps in any direction without restriction and combine therewith movement in real space with movement in a virtual space, i.e. ensure more complete immersion into virtual reality.

Another object at the base of the present invention is the creation of an apparatus for immersion into virtual reality, in which the use of a shell mounted on a support to form a real closed space and a unit for conversion of the virtual spaced in accordance with real physical movements of the user makes it possible to ensure more complete immersion of the user in virtual reality.

The stated object is attained in a method for immersion of a user into virtual reality, which consists of forming a virtual space in which objects appear and move in a predetermined and random manner, displaying a formed virtual space to a user, continuously converting a virtual space in accordance with real physical hand, foot and head movements of a user in real space, taking interaction with objects in the virtual space into account, in that in accordance with the invention, a closed shell limiting a real closed space is formed prior to the formation of the virtual space, the shell is mounted on a support means with the possibility for rotation about its center, the user is placed inside the shell with the possibility for free movement along the inner surface of the shell, the magnitude and direction of movement of the user relative to the shell are determined, and continuous conversion of the virtual space and its display to the user are additionally effected in accordance with the aforesaid determined magnitude and direction of movement.

It is useful that the shell be additionally rotated to minimize the moment of force which occurs when the center of gravity of the user moves relative to a vertical passing through the center of the shell.

It is advisable that a closed convex surface be used as the shell.

It is advantageous that a sphere be used as the closed convex surface.

It is useful that at least three ball supports, positioned under the shell, be used as the shell support.

It is advantageous that a perforated shell be used so that the user can freely breathe.

It is advisable that a shell of transparent material be used.

It is useful that the means for forming the virtual space be positioned outside the shell.

It is advantageous that the means for forming the virtual space be positioned inside the shell.

It is preferable that the means for forming the virtual space be positioned on the user.

It is useful that a support having the purpose of fixing ancillary means for forming virtual reality and the possibility of turning be mounted inside the shell.

The aforesaid object is also attained in an apparatus for immersion into virtual reality comprising means for forming a virtual space in which objects appear and move in a predetermined and random manner, to which are connected means for displaying the virtual space to the user and a unit for conversion of virtual space in accordance with real physical hand, foot and head movements of the user in a real space, taking into account interaction with the objects in virtual space, in that in accordance with the invention it comprises a closed shell limiting a real closed space and positioned on support means with the possibility for rotation about its center, an opening made in the shell and provided with a cover for the entrance and exit of the user, means for determining the magnitude and direction of movement of the user relative to the shell, which means is connected to the unit for conversion of virtual space.

It is advisable that the apparatus additionally comprise means for rotating the shell, connected to the support means and having the purpose of minimization of the moment of force occurring during displacement of the center of gravity of the user relative to a vertical passing through the center of the shell.

It is useful that the shell be a closed convex surface.

It is preferable that the closed convex surface be made in the form of a sphere.

It is advantageous that the support means of the shell consist of at least three ball supports.

It is useful that the shell be perforated.

It is advantageous that the shell be made of a transparent material.

It is preferable that the means for forming a virtual space be positioned outside the shell.

It is useful that the means for forming the real space be positioned inside the shell.

It is preferable that the means for forming the virtual space be positioned on the user.

It is useful that the apparatus comprise a support for fixing ancillary devices to form a virtual reality.

It is advisable that devices selected from the group consisting of a wheelchair imitating means for movement, a ball, dummies and devices imitating the action of an opponent in combat be used as the ancillary devices.

Further on the invention will be explained by concrete embodiments with reference to the accompanying drawings in which.

Figure 1:
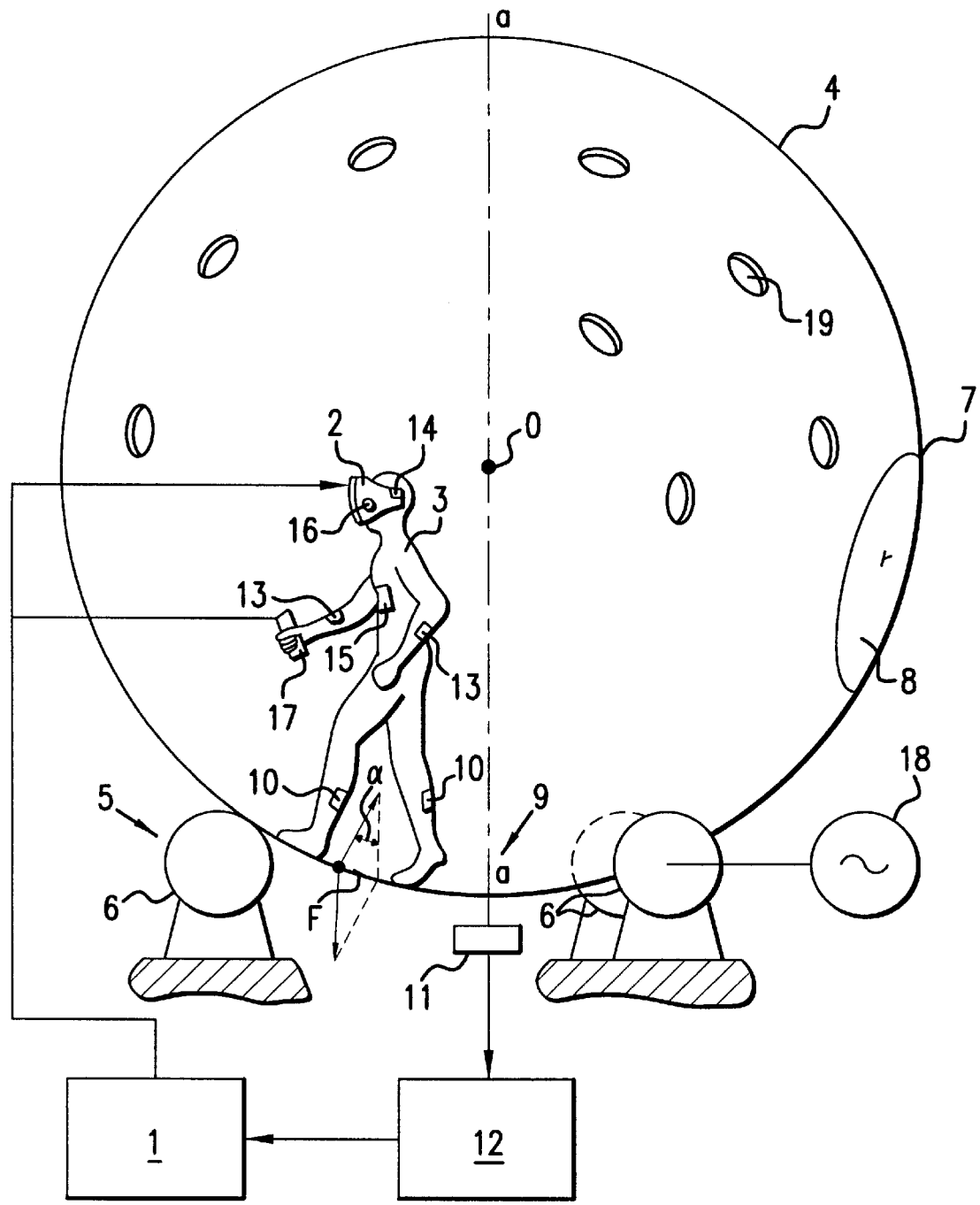
FIG. 1 shows an apparatus for immersion into virtual reality, in accordance with the invention.

The apparatus for immersion into virtual reality comprises means 1 (FIG. 1) of forming a virtual space in which objects appear and move in a predetermined and random manner. A computer with an accelerator of three-dimensional graphics is usually used as the means 1 of forming a virtual space.

A means 2 for displaying the virtual space to the user 3 is connected to the means 1. A headpiece, put on the head of the user and comprising two liquid crystal screens for transmitting imagery to the user and headphones for transmitting sound, is used in the variant being described as the means 2 for displaying the virtual space.

The apparatus comprises a closed shell 4, limiting a real closed space and positioned on a support means 5 with the possibility for rotation about its center O. In the variant being described, the support means of the shell consists of at least three ball supports 6. The ball supports 6 ensure free rotation of the shell 4 with three degrees of freedom about its center An opening 7 is made in the shell 4 for the entrance and exit of the user, the opening being provided with a cover 8.

The apparatus also comprises means 9 for determining the magnitude and direction of movement of the user 3 relative to the shell, the means being connected to the unit 1 for converting the virtual space. A sensor 10, using infrared radiation to determine the movement of the user relative to the shell, and a receiver 11 of the signals sent by the sensor 10, are used in the variant being described as the means 9.

The output of the receiver 11 of signals from the sensor of movement of the user relative to the shell is connected to a unit 12 for conversion of the virtual space in accordance with the real physical hand, foot and head movements of the user in the real space, taking into account interaction with the objects in the virtual space. With this in view, a number of sensors 13, 14, 15, 16, determining the position of the hands, feet, head, body of the user respectively, are mounted on the user 3.

The manipulator 17 is usually positioned in the user's hand and is connected to the means 1.

An embodiment of the apparatus is possible where it comprises means 18 for rotating the shell, this means being connected to the support 5 and having the purpose of minimizing the moment of force F produced when the center of gravity of the user is displaced relative to the vertical a—a passing through the center O of the shell 4.

Perforations 19 are made in the shell 4 so that the user can breathe while being inside the shell 4 for a long period of time.

Figure 2:
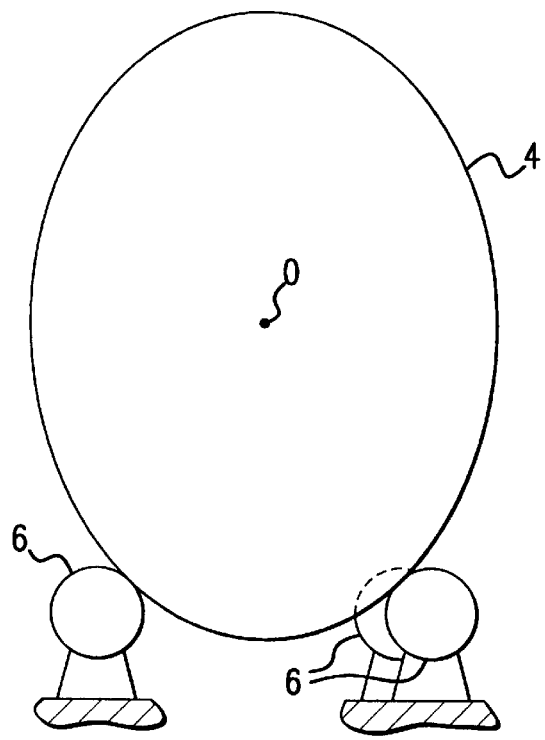
FIG. 2 shows an embodiment of the shell in the form of an ellipsoid of revolution, in accordance with the invention.

In the general case the shell 4 is a closed convex surface, for example, an ellipsoid of revolution (FIG. 2).

It is advisable that the shell be made in the form of a sphere (FIG. 1) of transparent material.

A variant is possible where a suspension 20, secured to the ceiling 21 of an indoor area where the apparatus is positioned and provided with at least three ball supports 22, is used as the support means 5. This variant is advisable for installation in arcades.

A variant is possible where a support 23, having a spherical surface coinciding with the curvature of the shell and made of a material having a low friction coefficient, is used as the support means 5.

It is shown in FIG. 1 that the means 1 of forming the virtual space is positioned outside the shell 4.

Figure 5:
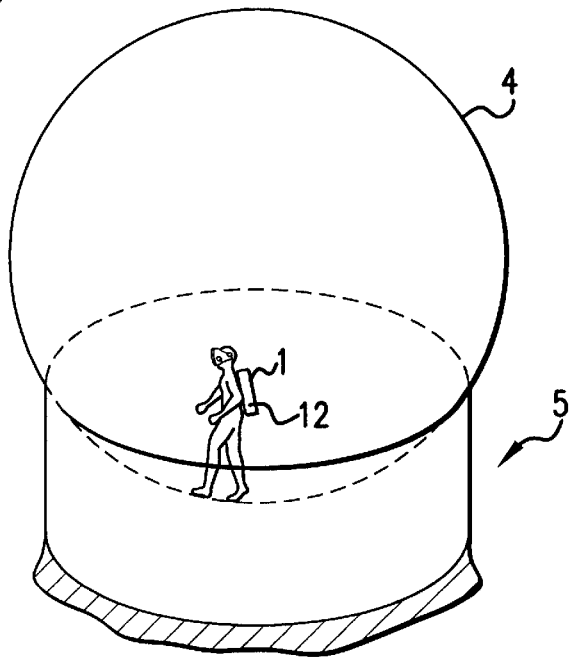
FIG. 5 shows a variant of arrangement of the means of forming the virtual space on the user, in accordance with the invention.
Figure 6:
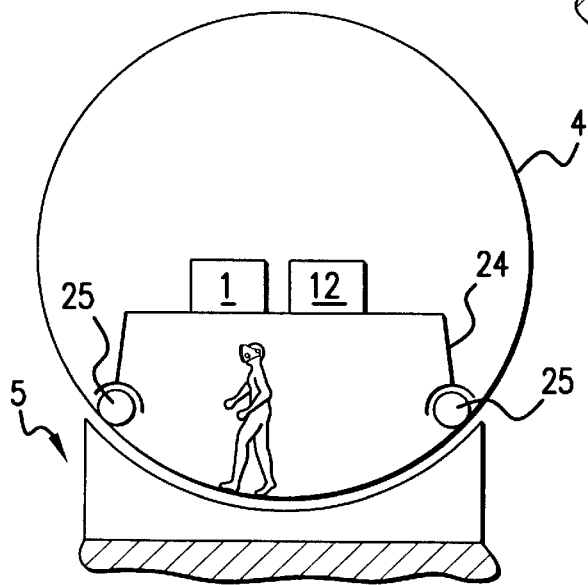
FIG. 6 shows a variant of arrangement of the means of forming the virtual space inside the shell on a support, in accordance with the invention.

A variant is possible where the means 1 of forming the virtual space is positioned inside the shell 4, wherewith the means 12 is also positioned inside the shell, or on the user 3 (FIG. 5) or on a support 24 (FIG. 6).

The support 24 for securing ancillary devices having the purpose of forming virtual reality is positioned inside the shell 4 on at least three ball supports 25. The center of gravity of the support 24 is located below the center O of the shell, which makes it possible for the support 24 to remain practically immobile relative to the support means 5.

Figure 8:
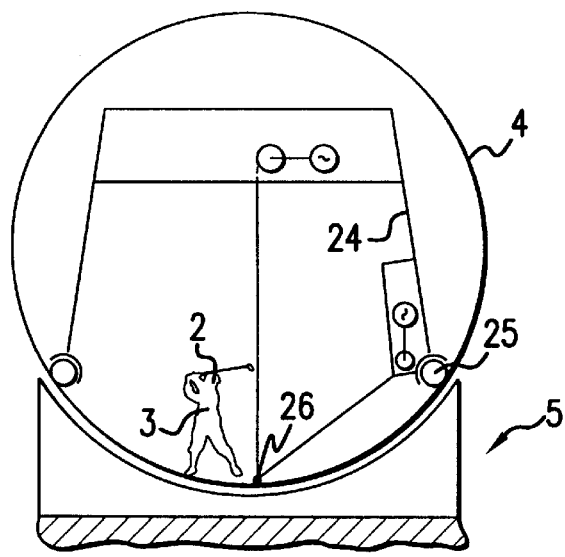
FIG. 8 shows a variant of realization of the ancillary device secured on a support in the form of a ball, in accordance with the invention.
Figure 9:
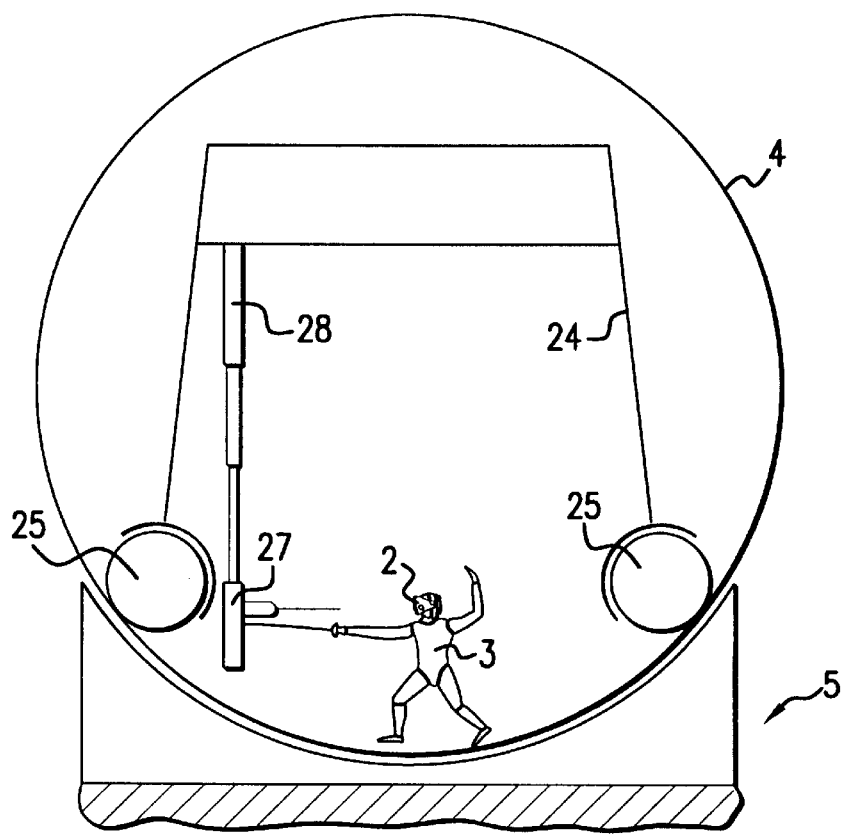
FIG. 9 shows a variant of realization of the ancillary device in the form of a dummy and a device imitating the behavior of an opponent in combat, in accordance with the invention.

A wheelchair imitating motorcycles (FIG. 7), automobiles, airplanes, spacecraft, balls 26 (FIG. 8), dummies 27 (FIG. 9) and devices 28 imitating the behavior of an opponent in combat may be used in the aforesaid apparatus as ancillary devices which are secured on the support 24.

The operation of the apparatus for immersion into virtual reality takes place in the following manner.

A closed shell 4 (FIG. 1) limiting a real closed space is formed. In the variant being described, a sphere mounted on the support means 5 with the possibility of rotation about its center O with three degrees of freedom is used as the shell.

A user 3, who has the possibility of free movement along the inner surface of the shell 4, is put in the shell 4.

A virtual space, in which objects, for example, walls of houses, trees, machines, animals, people, clouds, etc., appear and move in a predetermined and random manner, is formed by means of a computer.

The formed virtual space is displayed to the user on the screens of the headpiece 2 (FIG. 1), wherein the user sees a three-dimensional image of the virtual world.

Continuous conversion of the virtual space is carried out in accordance with an inserted program. Since the user does not see the edges of the screen because of the state-of-the-art construction of the headpiece, he gets the illusion of complete presence in a virtual three-dimensional space. The user obtains the desire to actively interact with the objects of that virtual space, for example, to touch a tree with his hands, approach an object, take it in his hands, dance with a virtual partner, fly in an airplane, etc. In accordance with a change in the position of the objects in the virtual space, the user changes his position in the real and virtual space by real physical hand, foot and head movements. The user, making real steps, approaches objects in the virtual space.

The magnitude and direction of movement of the user 3 relative to the shell 4 are determined, in accordance with which continuous conversion of the virtual space and its display to the user are carried out.

Figure 3:
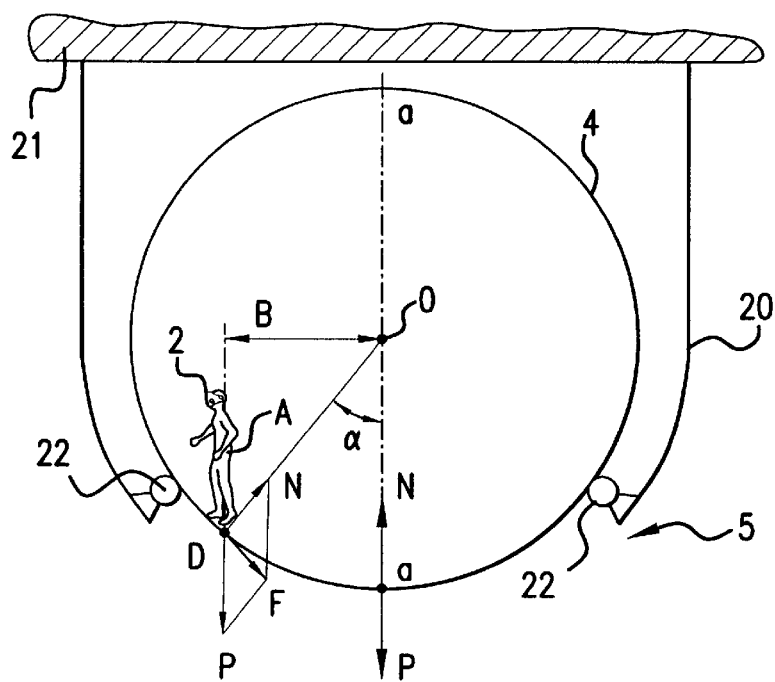
FIG. 3 shows an embodiment of the support of the shell, in accordance with the invention.
Figure 4:
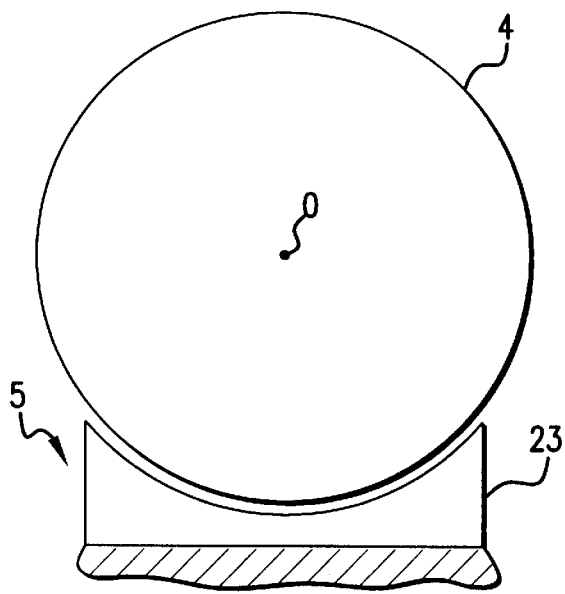
FIG. 4 shows another embodiment of the support of the shell, in accordance with the invention.

When the user 3 (FIG. 3) moves relative to the shell 4 his center of gravity A is displaced by a magnitude OB relative to the vertical a—a passing through the center O of the shell 4. Wherein a moment M of force F is produced which strives to turn the shell so that the center of gravity A of the user 3, acting on the support at point D on the shell 4, would move to the vertical a—a.

The moment M of force rotates the shell 4 under condition of minimum force of friction between the shell 4 and the support means 5 until the center of gravity A of the user lies on the vertical a—a. Thus, the shell moves in the reverse direction to the same magnitude as that which the user passed over the shell 4 in a forward direction. In real space the user returns to the initial position after one or two steps due to rotation of the shell, while actually remaining in one spot. Wherein his movement relative to the shell 4 has an effect on his position relative to the objects in the virtual space. Therefore his movement in the shell 4 makes it possible to move freely and without any restriction in the virtual space.

Since the function of movement in a virtual space, which was earlier carried out manually using a manipulator, is performed by the user himself by walking, he has greater possibilities for controlling objects manually using manipulators.

In practice when there is a force of friction, the moment M of force rotates the shell until the returning force F=P×sin & becomes equal to the force of friction between the support means 5 and the shell 4. This force of friction depends on the mass of the shell 4, the weight of the user 3, the weight of additional devices and the coefficient of friction between the shell 4 and the support means 5.

Wherein the moment of force M=P×R sin &, where P is the weight of a person, R is the radius OD, sin &=OB/OD.

In order to overcome the force of friction in the case when a natural returning force is not sufficient, a special device 18 is used which forcefully turns the shell 4 so as to minimize the deviation of the center A from the vertical a—a.

Figure 7:
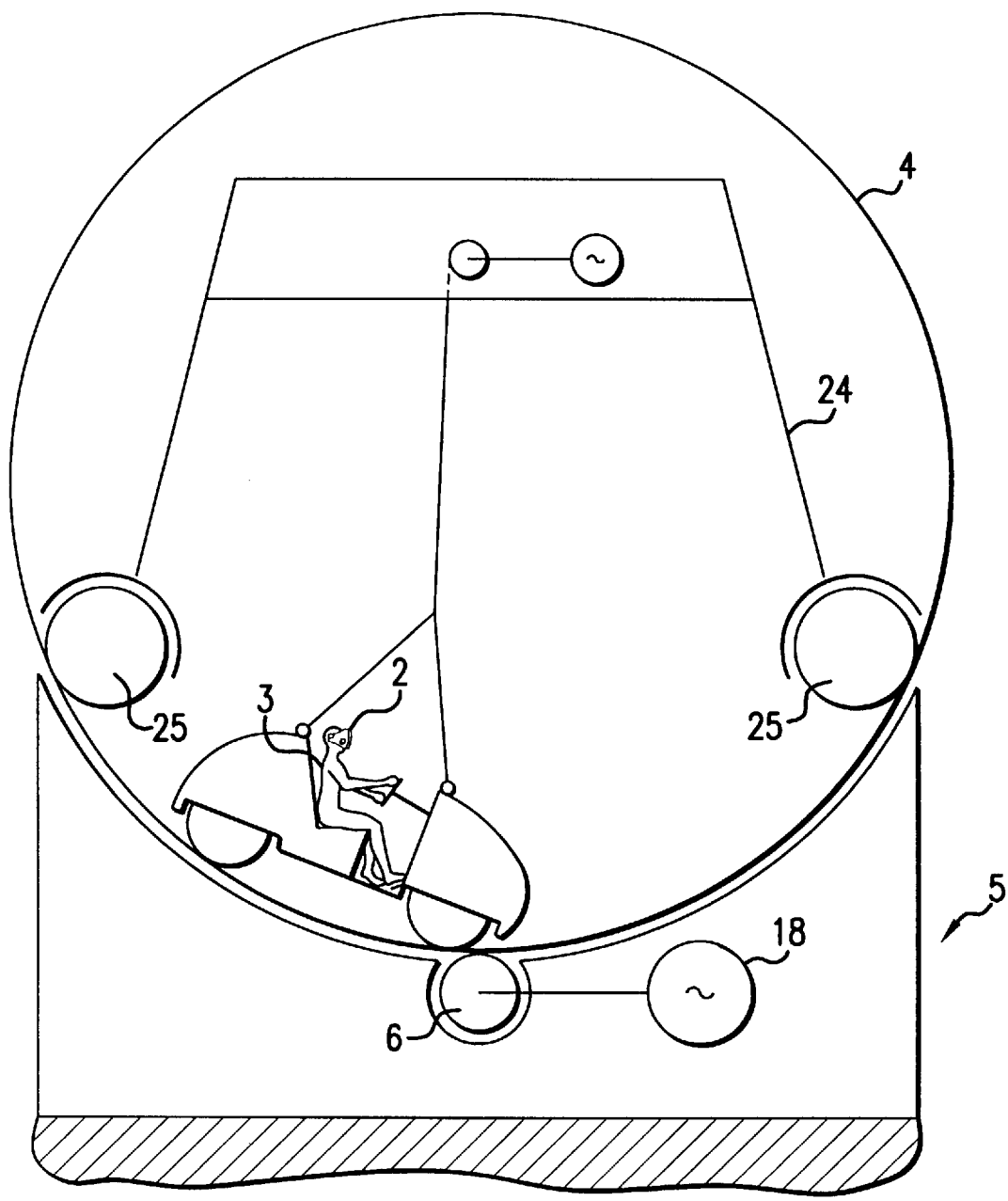
FIG. 7 shows a variant of realization of the ancillary device in the form of a wheelchair imitating a motorcycle, in accordance with the invention.

The device 18 can also be used to imitate movement of the user, for example in an automobile, helicopter, spacecraft, in which case a usual armchair or wheelchair with corresponding manipulators is placed in the shell (FIG. 7). In this case the shell 4 with the user sitting in a chair is turned and the center of gravity of the user is forcefully moved from the vertical a—a at such a speed and acceleration that the user gets the impression of real movement in accordance with the change in the displayed virtual space. Even if the center of gravity of the user coincides with the center of the sphere, the effect of reality of movement appears due to the action of pulses of rotation of the sphere on the vestibular apparatus of the user.

The support means 5 is displaced in a vertical direction in order to excite a corresponding reaction of the vestibular apparatus of the user in the imitation of rises and falls.

What is claimed is:

1. A method for immersion of a user in virtual reality comprising:
   forming a closed shell having a center and an inner surface,
   setting up a support means,
   mounting said shell on said support means for rotation on the support means about said center of rotation,
   wherein a user has a freedom of movement along said inner surface of said shell, and wherein a center of gravity of the user moves relative to a vertical axis passing through said center of the shell,
   providing the user with means for displaying a virtual space,
   forming a virtual space comprising virtual objects by means of computer means,
   displaying the formed virtual space to the user inside said shell on said means for displaying the virtual space, wherein interaction of the user with the objects of the virtual space is effected by movement of the user relative to a point of support,
   turning the shell under the effect of a force produced when said center of gravity of the user is displaced relative to the vertical axis passing through the center of the shell, the shell being turned in a direction opposite to the direction of movement of the user,
   determining magnitude and direction of change of a position of the user relative to said shell,
   modifying virtual space in accordance with physical hand, foot and head movements of the user inside said shell, taking into account interaction with said objects in the virtual space,
   modifying the virtual space in accordance with the obtained magnitude and direction of movement of the user and displaying the virtual space to the user.

2. A method as in claim 1, which includes rotating said shell in a forced manner using means for forced rotation so as to reduce the deviation of the center of gravity of the user from the vertical axis passing through the center of the shell.

3. A method as in claim 1 wherein the shell has a closed convex surface.

4. A method as in claim 3 wherein the closed convex surface is a sphere.

5. A method as in claim 1 which comprises arranging at least three ball supports under said shell, the three ball supports serving as said support means.

6. A method as in claim 1 wherein the shell is perforated.

7. A method as in claim 1 wherein the shell is made of transparent material.

8. A method as in claim 1 which comprises arranging said means for forming a virtual space outside of the shell.

9. A method as in claim 1 which comprises arranging the means for forming a virtual space inside the shell.

10. A method as in claim 9 which comprises arranging the means for forming a virtual space on the user.

11. A method as in claim 1 which comprises arranging a support means for securing ancillary means for forming virtual reality inside the shell.

12. An apparatus for immersion into virtual reality comprising
   a shell having a center and an inner surface,
   a support means on which said shell is arranged for rotation, wherein the shell turns when center of gravity of a user is displaced relative to a vertical axis passing through the center of the shell, the shell being turned in a direction opposite to the direction of movement of the user,
   means for forming a virtual space comprising virtual objects,
   means for displaying the formed virtual space to the user, connected to the means for forming a virtual space,
   a unit for modifying the virtual space in accordance with physical movements of the user, taking into account interaction of the user with the objects in the virtual space,
   means for determining magnitude and direction of movement of the user relative to a point of support of the user on the shell, wherein the means for determining is connected to said unit for modifying the virtual space.

13. An apparatus as in claim 12 which additionally comprises
   means for rotating the shell, connected to said support means, so as to reduce the deviation of the center of gravity of the user relative to the vertical axis passing through said center of the shell.

14. An apparatus as in claim 12 in which said shell is a closed convex surface.

15. An apparatus as in claim 14 in which said closed convex surface is a sphere.

16. An apparatus as in claim 12 in which said support means comprises at least three ball supports.

17. An apparatus as in claim 12 in which the shell includes perforations.

18. An apparatus as in claim 12 in which the shell is made of transparent material.

19. An apparatus as in claim 12 in which said means for forming virtual space is arranged outside of said shell.

20. An apparatus as in claim 12 in which said means for forming virtual space is arranged inside of said shell.

21. An apparatus as in claim 20 in which said means for forming virtual space is arranged on the user.

22. An apparatus as in claim 12 which additionally comprises a quasi-stationary support for securing ancillary devices for forming virtual reality.

23. An apparatus as in claim 22 in which one or more devices selected from a group consisting of a wheelchair, imitating means for movement, a ball, dummies and devices imitating behavior of an opponent in combat are used as said ancillary devices.

24. A method for immersion of a user in virtual reality using a shell mounted on a support means for rotation, wherein a user is positioned within the shell and provided with means for displaying a virtual space comprising:

forming a virtual space comprising virtual objects by means of a computer, displaying at least a portion of the formed virtual space to the user using the means for displaying the virtual space, turning the shell when the center of gravity of the user is displaced relative to a vertical axis passing through the center of the shell, the shell being turned in a direction opposite to a direction of movement of the user, determining magnitude and direction of change of a position of the user relative to the shell, modifying the virtual space on the basis of the determined magnitude and direction of movement of the user and displaying at least a portion of the modified virtual space to the user.

* * * * *